US008482757B2

(12) United States Patent
Nanaumi

(10) Patent No.: US 8,482,757 B2
(45) Date of Patent: Jul. 9, 2013

(54) IMAGE FORMING APPARATUS, CONTROL METHOD THEREFOR, IMAGE FORMING SYSTEM, AND PROGRAM

(75) Inventor: Yoshihito Nanaumi, Yokohama (JP)

(73) Assignee: Canon Kabushiki Kaisha (JP)

( * ) Notice: Subject to any disclaimer, the term of this patent is extended or adjusted under 35 U.S.C. 154(b) by 1462 days.

(21) Appl. No.: 11/551,929

(22) Filed: Oct. 23, 2006

(65) Prior Publication Data

US 2007/0097426 A1    May 3, 2007

(30) Foreign Application Priority Data

Oct. 26, 2005   (JP) .................................. 2005-311805

(51) Int. Cl.
G06F 3/12      (2006.01)
(52) U.S. Cl.
USPC .......... 358/1.15; 358/1.1; 358/1.13; 358/1.14
(58) Field of Classification Search
USPC ............ 358/1.15, 296, 1.16, 1.18, 1.14, 1.13, 358/1.1; 710/104
See application file for complete search history.

(56) References Cited

U.S. PATENT DOCUMENTS

| 5,287,194 | A * | 2/1994 | Lobiondo ..................... 358/296 |
| 5,488,407 | A * | 1/1996 | Tachibana .................... 347/264 |
| 6,502,147 | B2 * | 12/2002 | Reilly ........................ 710/104 |
| 7,595,903 | B2 * | 9/2009 | Kizaki et al. .................. 358/1.15 |
| 2002/0015185 | A1 * | 2/2002 | Onishi et al. .................. 358/1.16 |
| 2002/0036799 | A1 * | 3/2002 | Sumiyama et al. ........... 358/1.15 |
| 2002/0181013 | A1 * | 12/2002 | Dunlap ........................ 358/1.15 |
| 2004/0190039 | A1 * | 9/2004 | Lay et al. ...................... 358/1.14 |
| 2004/0194013 | A1 * | 9/2004 | Nishikawa .................... 715/500 |
| 2004/0212832 | A1 * | 10/2004 | Shibata ........................ 358/1.16 |
| 2005/0036168 | A1 * | 2/2005 | Shoji et al. .................... 358/1.15 |
| 2005/0134909 | A1 * | 6/2005 | Shima et al. .................. 358/1.15 |
| 2005/0216514 | A1 * | 9/2005 | Murata ........................ 707/104.1 |

FOREIGN PATENT DOCUMENTS

JP       11-191041  A       7/1999

* cited by examiner

*Primary Examiner* — King Poon
*Assistant Examiner* — Allen H Nguyen
(74) *Attorney, Agent, or Firm* — Rossi, Kimms & McDowell LLP

(57) ABSTRACT

Data to be printed in accordance with a print instruction is acquired by referring to management information on data containing the storage positions of the data which are managed on storage media and managed in image forming apparatuses on the network including the image forming apparatus and an external image forming apparatus. The acquired data is printed. The first print count when the image forming apparatus acquires the data to be printed from the external image forming apparatus and prints the data in the print step is compared with the second print count of the data in the external image forming apparatus. The data acquired from the external image forming apparatus is stored in a storage device as master data to be managed by the storage device in the image forming apparatus on the basis of the comparison result.

14 Claims, 12 Drawing Sheets

FIG. 4

| | 1301 | 1302 | 1303 PRINT DATA NAME | 1304 STORAGE POSITION | 1305 PRINT START TIME | 1306 PRINT END TIME | 1307 PRINT DATA CAPACITY | 1308 PRINT COUNT | 1309 PRINT PAPER SIZE |
|---|---|---|---|---|---|---|---|---|---|
| | ID | PRINT USER NAME | | | | | | | |
| 1310 | 0001 | 0391 | IMAGE_SUN | ¥¥ IMAGE FORMING APPARATUS 102¥FolderA¥ | 2005/06/09/9:19:45 | 2005/06/09/9:19:50 | 300k | 2 | A4 |
| 1311 | 0002 | 0525 | IMAGE_ROCK | ¥¥ IMAGE FORMING APPARATUS 103¥FolderE¥ | 2005/06/09/9:20:15 | 2005/06/09/9:20:17 | 126k | 1 | A4 |
| 1312 | 0003 | 0333 | IMAGE_PERSON 1 | ¥¥ IMAGE FORMING APPARATUS 108¥FolderX¥ | 2005/06/09/9:20:30 | 2005/06/09/9:20:40 | 500k | 2 | B5 |
| 1313 | 0004 | 0222 | IMAGE_PERSON 2 | ¥¥ IMAGE FORMING APPARATUS 108¥FolderC¥ | 2005/06/09/9:20:50 | 2005/06/09/9:20:55 | 422k | 2 | A4 |

| ID 601 | PRINT DATA NAME 602 | PRINT DATA CAPACITY 603 | MASTER DATA STORAGE POSITION 604 | MASTER DATA PRINT COUNT 605 | CACHED-DATA PRINT COUNT 606 | PRINT COUNT PER UNIT TIME 607 |
|---|---|---|---|---|---|---|
| 1 | IMAGE_ROCK | 126k | ¥¥ IMAGE FORMING APPARATUS 103¥FolderE¥ | 5 | 1 | 3.3 |
| 2 | IMAGE_PERSON_1 | 422k | ¥¥ IMAGE FORMING APPARATUS 108¥FolderC¥ | 3 | 2 | 2 |
| 3 | IMAGE_PERSON_2 | 500k | ¥¥ IMAGE FORMING APPARATUS 108¥FolderX¥ | 2 | 1 | 1.1 |

| ID 1501 | PRINT DATA 1502 | STORAGE POSITION 1503 | PRINT DATA CAPACITY 1504 |
|---|---|---|---|
| 0001 | IMAGE_SUN | ¥¥IMAGE FORMING APPARATUS102¥FolderA¥ | 300k |
| 0002 | IMAGE_ROCK | ¥¥IMAGE FORMING APPARATUS103¥FolderE¥ | 120k |
| 0003 | IMAGE_PERSON 1 | ¥¥IMAGE FORMING APPARATUS108¥FolderX¥ | 500k |
| 0004 | IMAGE_PERSON 2 | ¥¥IMAGE FORMING APPARATUS108¥FolderC¥ | 422k |

1500

1505 1506 1507 1508

IMAGE FORMING APPARATUS, CONTROL METHOD THEREFOR, IMAGE FORMING SYSTEM, AND PROGRAM

BACKGROUND OF THE INVENTION

1. Field of the Invention

The present invention relates to an image forming system capable of mutually transmitting/receiving data between a plurality of image forming apparatuses via a network, an image forming apparatus, a control method therefor, and a program.

2. Description of the Related Art

An image forming apparatus can incorporate an external storage device such as a hard disk to store document data, spool print data, temporarily save print data, and save printed data. An image forming apparatus of this type can constitute a system capable of communicating with a plurality of devices via a network.

For example, according to Japanese Patent Laid-Open No. 11-191041, a print processing apparatus having a data save unit stores print data in the data save unit. At this time, the print processing apparatus changes the save format of print data in accordance with the print frequency. As for print data of high print frequency, the print processing apparatus saves its raw print data (whose capacity is large but re-printing speed is high).

There is a system in which a plurality of image forming apparatuses exist, each comprise an external storage device such as a hard disk, and can cooperate with each other via a network. This system can store document data to be printed in the external storage device of each image forming apparatus, or distribute one document data to a plurality of image forming apparatuses to print.

In this system, it is important in terms of operability to distributedly store document data in a plurality of image forming apparatuses without causing a user to be aware of where the document data is stored.

This system allows a user to similarly handle local data managed in an image forming apparatus operated by him and remote data managed by another image forming apparatus on the network. The performance of various processes such as a print process in the system greatly changes depending on whether document data required by a user is stored at a proper position. If the data storage position is improper in the system capable of distributedly processing target data, the performance of various processes such as a print process degrades.

SUMMARY OF THE INVENTION

The present invention has been made to overcome the conventional drawbacks, and has as its object to provide an image forming apparatus capable of increasing the process efficiency of each apparatus which constitutes a system, and reducing the network traffic between apparatuses, a control method therefor, an image forming system, and a program.

According to the present invention, the foregoing object is attained by providing an image forming apparatus capable of transmitting/receiving data to/from another image forming apparatus on a network, comprising:

a storage unit adapted to store data managed in the image forming apparatus as master data;

a management unit adapted to manage management information on data containing storage positions of the data managed in image forming apparatuses on the network including the image forming apparatus and the other image forming apparatus;

an acquisition unit adapted to acquire data to be printed in accordance with a print instruction by referring to the management information;

a print unit adapted to print the data acquired by the acquisition unit;

a comparison unit adapted to compare a first print count when the image forming apparatus acquires the data to be printed from the other image forming apparatus and prints the data by the print unit, with a second print count of the data in the other image forming apparatus; and a storage control unit adapted to store, in the storage unit, the data acquired from the other image forming apparatus as master data to be managed by the storage unit in the image forming apparatus on the basis of a comparison result of the comparison unit.

In a preferred embodiment, when the first print count is larger than the second print count as a result of comparison by the comparison unit, the storage control unit stores data acquired from the other image forming apparatus in the storage unit in the image forming apparatus.

In a preferred embodiment, the comparison unit executes comparison every time the print unit completes printing.

In a preferred embodiment, the apparatus further comprises a display unit adapted to display the master data managed in the image forming apparatus and the other image forming apparatus, and display an operation window for designating arbitrary master data from the displayed master data and designating printing.

In a preferred embodiment, the apparatus further comprises a reception unit adapted to, when the other image forming apparatus manages the data to be printed, receive the data and the second print count of the data in the other image forming apparatus from the other image forming apparatus, wherein when the first print count is larger than the second print count in first comparison upon completion of printing by the print unit, the reception unit receives the second printing again for second comparison and the comparison unit compares the second print count with the first print count again.

In a preferred embodiment, when the first print count is larger than the second print count as a result of second comparison by the comparison unit, the storage control unit stores the data acquired from the other image forming apparatus as master data to be stored in the storage unit in the image forming apparatus.

According to the present invention, the foregoing object is attained by providing an image forming system capable of mutually transmitting/receiving data between a plurality of image forming apparatuses via a network, each of the plurality of image forming apparatuses comprising:

a storage unit adapted to store data managed in the image forming apparatus as master data;

a management unit adapted to manage management information on data containing storage positions of the data managed in the image forming apparatuses on the network including the image forming apparatus and another image forming apparatus;

an acquisition unit adapted to acquire data to be printed in accordance with a print instruction by referring to the management information;

a print unit adapted to print the data acquired by the acquisition unit;

a comparison unit adapted to compare a first print count when the image forming apparatus acquires the data to be printed from the other image forming apparatus and prints the data by the print unit, with a second print count of the data in the other image forming apparatus; and a storage control unit adapted to store, in the storage unit, the data acquired from the other image forming apparatus as master data to be managed by the storage unit in the image forming apparatus on the basis of a comparison result of the comparison unit.

According to the present invention, the foregoing object is attained by providing a method of controlling an image forming apparatus capable of transmitting/receiving data to/from another image forming apparatus on a network, comprising:

an acquisition step of acquiring data to be printed in accordance with a print instruction by referring to management information on data containing storage positions of the data which are managed on storage media and managed in image forming apparatuses on the network including the image forming apparatus and the other image forming apparatus;

a print step of printing the data acquired in the acquisition step;

a comparison step of comparing a first print count when the image forming apparatus acquires the data to be printed from the other image forming apparatus and prints the data in the print step, with a second print count of the data in the other image forming apparatus; and a storage control step of storing, in a storage device, the data acquired from the other image forming apparatus as master data to be managed by the storage device in the image forming apparatus on the basis of a comparison result in the comparison step.

According to the present invention, the foregoing object is attained by providing a program stored in a computer-readable medium, which causes a computer to control an image forming apparatus capable of transmitting/receiving data to/from another image forming apparatus on a network, the program causing the computer to execute an acquisition step of acquiring data to be printed in accordance with a print instruction by referring to management information on data containing storage positions of the data which are managed on storage media and managed in image forming apparatuses on the network including the image forming apparatus and the other image forming apparatus, a print step of printing the data acquired in the acquisition step, a comparison step of comparing a first print count when the image forming apparatus acquires the data to be printed from the other image forming apparatus and prints the data in the print step, with a second print count of the data in the other image forming apparatus, and a storage control step of storing, in a storage device, the data acquired from the other image forming apparatus as master data to be managed by the storage device in the image forming apparatus on the basis of a comparison result in the comparison step.

Further features of the present invention will become apparent from the following description of exemplary embodiments with reference to the attached drawings.

BRIEF DESCRIPTION OF THE DRAWINGS

FIG. 4 is a table showing a print history table which manages print history data according to the embodiment of the present invention;

FIG. 5 is a table showing a cache area management table which manages document data stored in a cache area according to the embodiment of the present invention;

FIG. 7 is a table showing a user display management table according to the embodiment of the present invention;

DESCRIPTION OF THE EMBODIMENT

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
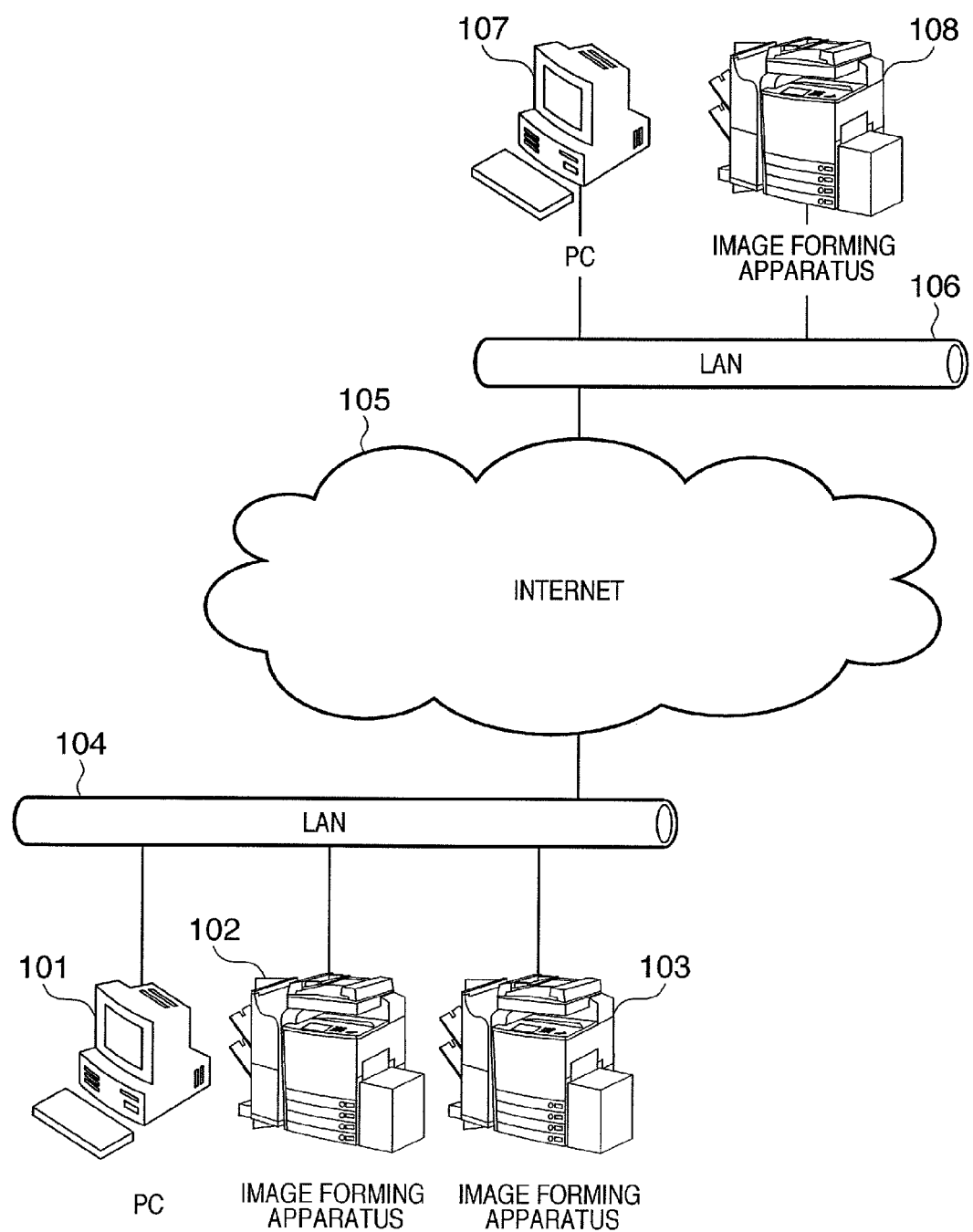
FIG. 1 is a view showing an example of the configuration of an image forming system according to an embodiment of the present invention.

FIG. 1 is a view showing an example of the configuration of an image forming system according to the embodiment of the present invention.

In FIG. 1, reference numerals 104 and 106 denote LANs (Local Area Networks). Reference numerals 101 and 107 denote printing clients which are computer apparatuses and comprise hardware resources of so-called PCs (Personal Computers). Reference numerals 102, 103, and 108 denote image forming apparatuses. Reference numeral 105 denotes Internet. Various devices connected to the LANs 104 and 106 connect to each other and can communicate with each other by a predetermined protocol.

The printing clients 101 and 107 load system resources (e.g., a printer driver) from a storage device (e.g., a hard disk) into a RAM. The printing clients 101 and 107 display the print control window of the printer driver upon reception of a print request from an application, and respond to the print request from the user.

Note that the printing clients 101 and 107 each comprise standard building components (e.g., a CPU, RAM, ROM, hard disk, external storage device, network interface, display, keyboard, and mouse) of a general-purpose computer.

The network is configured by the LANs 104 and 106 and the Internet 105 in FIG. 1, but is not limited to them. For example, the network can adopt any one of a WAN, telephone line, dedicated digital circuit, ATM, frame relay line, communication satellite channel, cable television line, data broadcasting radio channel, and the like, other than the Internet and LAN.

The detailed arrangement of the image forming apparatuses 102, 103, and 108 will be explained with reference to FIG. 2.

Figure 2:
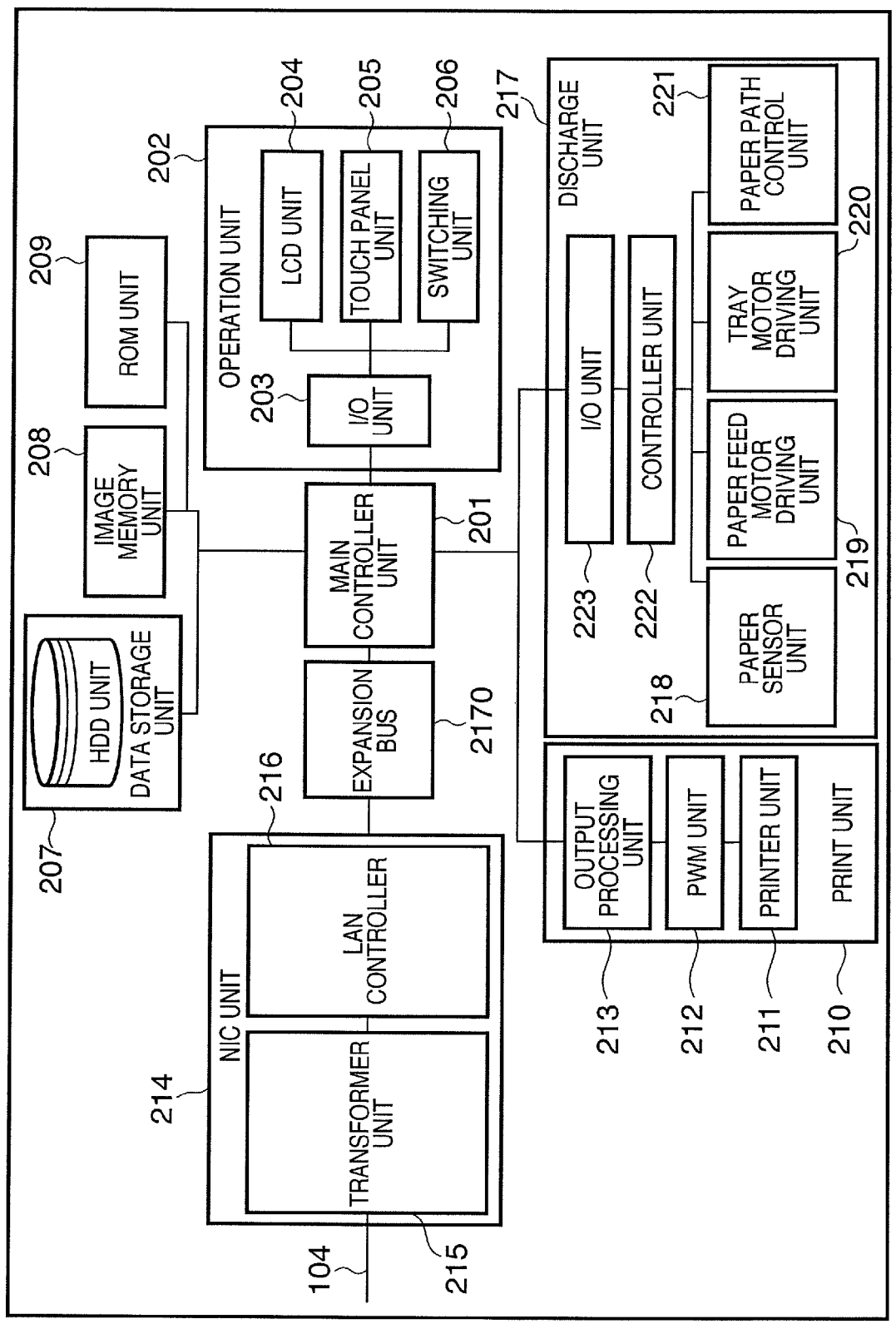
FIG. 2 is a block diagram showing the detailed arrangement of an image forming apparatus according to the embodiment of the present invention.

FIG. 2 is a block diagram showing the detailed arrangement of the image forming apparatus according to the embodiment of the present invention.

FIG. 2 shows the detailed arrangement of the image forming apparatus 102, but the image forming apparatuses 103 and 108 also have the same arrangement.

In FIG. 2, reference numeral 201 denotes a main controller unit which controls the overall image forming apparatus 102.

Reference numeral 202 denotes an operation unit which allows an operator to operate the image forming apparatus 102. Reference numeral 203 denotes an I/O unit which allows the operation unit 202 to communicate with the main controller unit 201. Reference numeral 204 denotes an LCD unit which provides information to an operator and presents virtual switches. Reference numeral 205 denotes a touch panel unit which detects an operation to a virtual switch displayed on the LCD unit 204. Reference numeral 206 denotes a switching unit in which keys, buttons, switches, and the like to be operated by an operator are physically arranged.

Reference numeral 207 denotes a data storage unit which stores print data and programs (printer driver and various control programs), and functions as a data cache area. The data storage unit 207 is formed from, e.g., an HDD (Hard Disk Drive). Reference numeral 208 denotes an image memory unit used to expand and process a print image. Reference numeral 209 denotes a ROM unit which stores default parameters, programs for booting the image forming apparatus, and the like.

Reference numeral 2170 denotes an expansion bus used to expand functions of the image forming apparatus 102.

Reference numeral 214 denotes a NIC (Network Interface Card) unit which is added to the image forming apparatus 102 by using the expansion bus 2170. Reference numeral 216 denotes a LAN controller which monitors communication packets flowing through the LAN 104, receives only information on the image forming apparatus 102, and sends packets formed by the image forming apparatus 102 to the LAN 104. Reference numeral 215 denotes a transformer unit which transforms a voltage and implements physical communication between the image forming apparatus 102 and the LAN 104.

Reference numeral 210 denotes a print unit which prints an image on paper serving as a print medium. Reference numeral 213 denotes an output processing unit which executes various image processes for converting image data sent from the main controller unit 201 into data suitable for printing on paper. The image processes include, e.g., gamma conversion, edge emphasis, and smoothing. Reference numeral 212 denotes a PWM unit which converts image data having undergone an output process into a signal for driving a laser beam. Reference numeral 211 denotes a printer unit which prints an image on paper on the basis of a signal supplied by a laser beam.

The printer unit 211 adopts a laser beam printing method. However, the present invention is not limited to this printing method, and may employ another printing method such as an inkjet printing method.

Reference numeral 217 denotes a discharge unit which discharges paper printed by the print unit 210 outside the image forming apparatus 102. Reference numeral 223 denotes an I/O unit which allows the discharge unit 217 to communicate with the main controller unit 201. Reference numeral 222 denotes a controller unit which controls the discharge unit 217. Reference numeral 218 denotes a paper sensor unit which monitors the flow of paper passing through the discharge unit 217. Reference numeral 219 denotes a paper feed motor driving unit which drives a motor for delivering paper. Reference numeral 220 denotes a tray motor driving unit which drives a discharge tray. Reference numeral 221 denotes a paper path control unit which controls the paper flow.

A plurality of image forming apparatuses which constitute the image forming system according to the embodiment can refer to document data (master data) managed in the storage devices of the remaining image forming apparatuses. If necessary, the image forming apparatus can acquire master data from another image forming apparatus and print it.

The structure of the data storage unit 207 will be explained with reference to FIG. 3.

Figure 3:
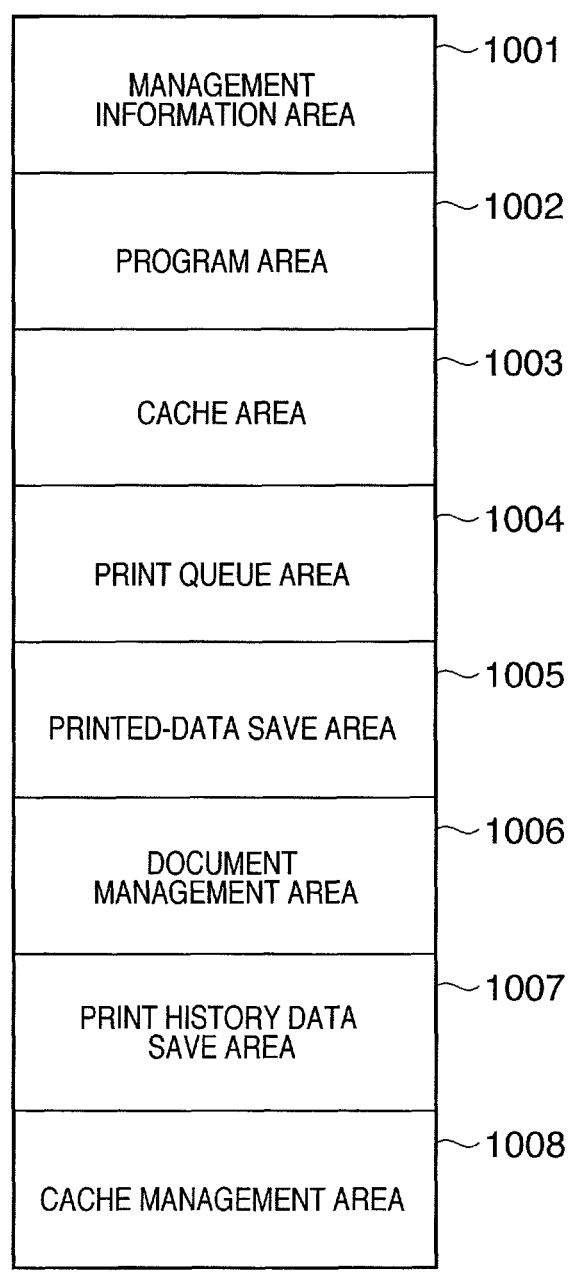
FIG. 3 is a view showing the structure of a data storage unit according to the embodiment of the present invention.

FIG. 3 is a view showing the structure of the data storage unit according to the embodiment of the present invention.

In FIG. 3, reference numeral 1001 denotes a management information area which stores management information of the data storage unit 207. Reference numeral 1002 denotes a program area which stores a program for controlling the image forming apparatus 102. Reference numeral 1003 denotes a cache area used as a temporary save area for data such as temporary data generated in the main controller unit 201 during a process, and document data temporarily downloaded from another data processing apparatus.

Reference numeral 1004 denotes a print queue area used as a spool area for data before printing. Reference numeral 1005 denotes a printed-data save area which saves print data after printing for reuse. Reference numeral 1006 denotes a document management area which saves various types of document data such as an application document, a FAX document, and an image document (e.g., a scanned document). Reference numeral 1007 denotes a print history data save area which saves print history data. Reference numeral 1008 denotes a cache management area which saves cache area management data.

<Print History Table>

FIG. 4 is a table showing a print history table which manages print history data according to the embodiment of the present invention.

Reference numeral 1300 denotes print history information which is written in a print history file in the print history data save area 1007. Reference numeral 1301 denotes a history ID which is a numerical value uniquely assigned to each print job and is incremented by one every printing.

Reference numeral 1302 denotes a print user name representing the user name of a user who printed. Reference numeral 1303 denotes a print data name representing the document name of printed document data. Reference numeral 1304 denotes a storage position representing the path of a position where printed document data is stored. Reference numeral 1305 denotes a print start time representing the time when a print process starts. Reference numeral 1306 denotes a print end time representing the time when a print process ends.

Reference numeral 1307 denotes a print data capacity representing the capacity of printed document data. Reference numeral 1308 denotes a print count representing the number of paper sheets printed by a print job. Reference numeral 1309 denotes a print paper size representing the paper size of printed paper.

Reference numeral 1310 denotes one record of a print history file whose history ID 1301 is "001". In the print history file, the print user name 1302 is "0391", the print data name 1303 is "image_sun", and the storage position is "¥¥image forming apparatus 102¥FolderA¥". The print start time is "2005/06/09 9:19:45", the print end time is "2005/06/09 9:19:50", the print data capacity is "300 k", the print count is "2 sheets", and the print paper size is "A4".

Similarly, print history files 1311, 1312, and 1313 serving as other records also store pieces of information shown in FIG. 4.

The print history file is stored in the print history data save area 1007, read out by the main controller unit 201 in printing, and recorded at the end of printing.

<Cache Area Management Table>

FIG. 5 is a table showing a cache area management table which manages document data stored in the cache area according to the embodiment of the present invention.

The cache management area 1008 saves the cache area management table as a cache area management file.

Reference numeral 600 denotes a cache area management table representing the entire table. Reference numeral 601 denotes an ID representing a management ID. Reference numeral 602 denotes a print data name representing the document name of printed document data. Reference numeral 603 denotes a print data capacity representing the capacity of printed document data.

Reference numeral 604 denotes a master data storage position representing the path of a position where master data serving as a master of cached data is stored. The master data means original document data locally stored in the storage device of an image forming apparatus among the storage devices of a plurality of image forming apparatuses on the network. The master data is not erased unless the operator designates erase from the operation unit 202 or another apparatus. The cached data is automatically erased when, for example, the time has elapsed or the storage area runs short.

Reference numeral 605 denotes a master data print count representing the count at which master data is printed. Reference numeral 606 denotes a cached-data print count representing the count at which document data in the cache area is printed. Reference numeral 607 denotes a print count per unit time representing the count at which cached data is printed per unit time.

Each record corresponds to one document data stored in the cache area 1003. Records in the cache area management table 600 are sorted in descending order of the print count per unit time of cached document data so as to manage the data amount of the cache area 1003 not to exceed a predetermined amount.

More specifically, a new record is added to the cache area management table 600 in printing. Instead, a record of a low print count per unit time is deleted, and document data cached in the cache area 1003 is also deleted. The cache area management table 600 is calculated again every print instruction and maintains the latest state.

<Document Management Table of Document Management Area (Master Data)>

Figure 6:
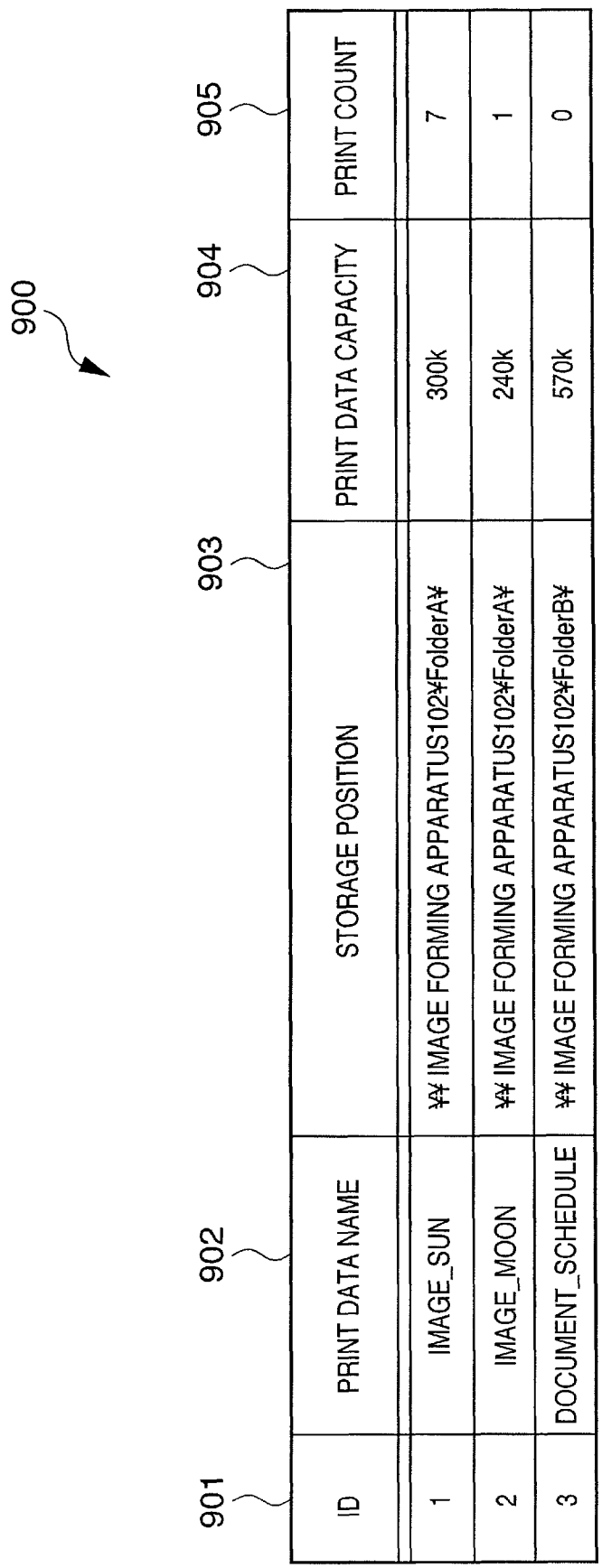
FIG. 6 is a table showing the document management table of a document management area according to the embodiment of the present invention.

FIG. 6 is a table showing the document management table of the document management area according to the embodiment of the present invention.

Reference numeral 900 denotes a document management table representing the management table of the document management area 1006 of the image forming apparatus 102. Reference numeral 901 denotes an ID representing a management ID. Reference numeral 902 denotes a print data name representing the document name of stored document data.

Reference numeral 903 denotes a storage position representing the path of a position where document data is stored. Reference numeral 904 denotes a print data capacity representing the capacity of document data. Reference numeral 905 denotes a print count representing the print count at which the image forming apparatus 102 prints document data.

<User Display Management Table>

FIG. 7 is a table showing a user display management table according to the embodiment of the present invention.

Reference numeral 1500 denotes a user display management table representing information on document data displayed to a user on the LCD unit 204 of the operation unit 202. Reference numeral 1501 denotes an ID representing a management ID. Reference numeral 1502 denotes a print data name representing the document name of document data stored in the document management area 1006.

Reference numeral 1503 denotes a storage position representing the path of a position where document data is stored. Reference numeral 1504 denotes a print data capacity representing the capacity of document data. Reference numerals 1505 to 1508 denote records having IDs "0001" to "0004".

<User View>

Figure 8:
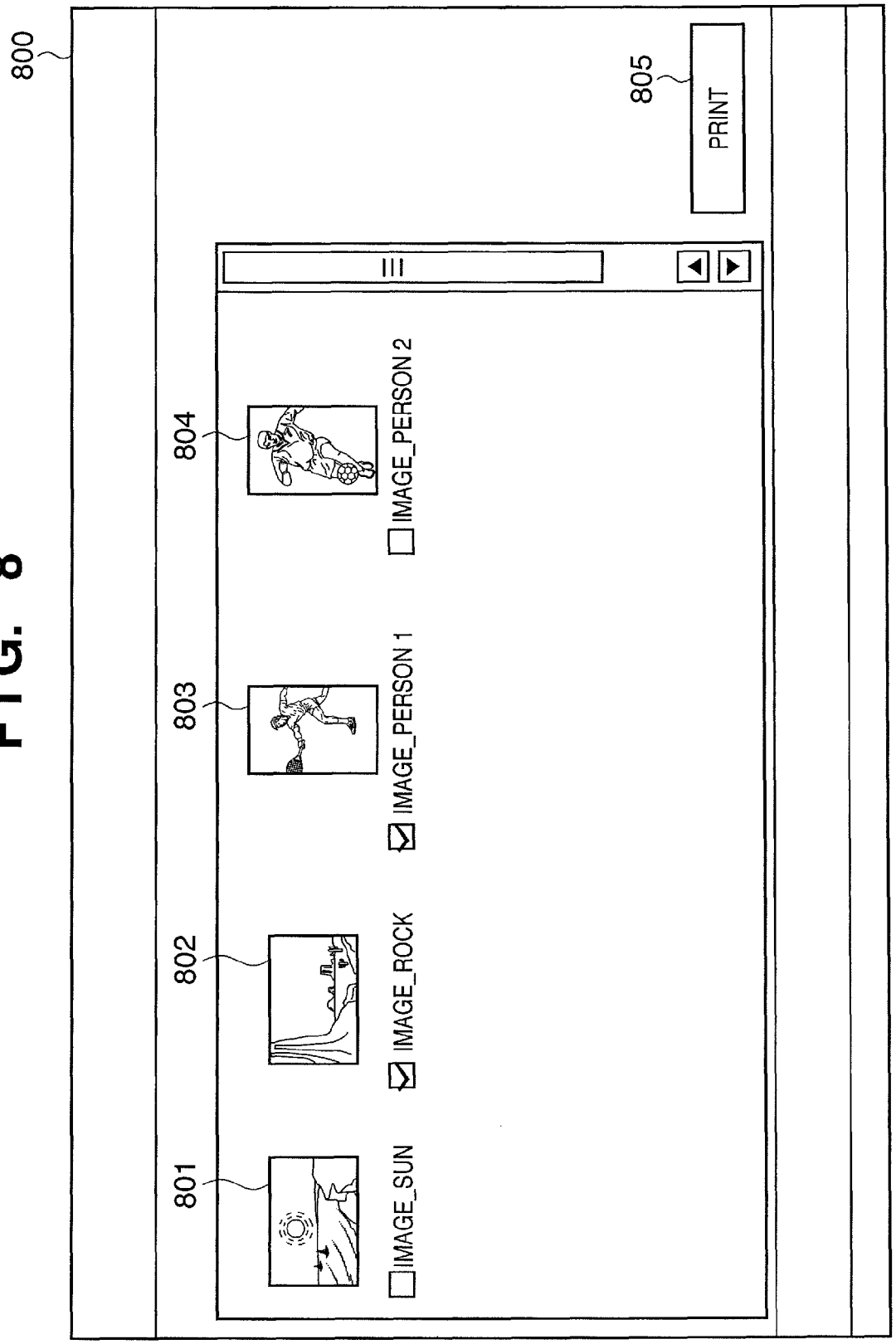
FIG. 8 is a view for explaining a user view according to the embodiment of the present invention.

FIG. 8 is a view for explaining a user view according to the embodiment of the present invention.

Reference numeral 800 denotes a display example on the LCD unit 204 of the operation unit 202. The main controller unit 201 generates this display by looking up the user display management table 1500 (FIG. 7). Reference numeral 801 denotes a document thumbnail corresponding to the record 1505 (FIG. 7). Reference numeral 802 denotes a document thumbnail corresponding to the record 1506. Reference numeral 803 denotes a document thumbnail corresponding to the record 1507. Reference numeral 804 denotes a document thumbnail corresponding to the record 1508.

Reference numeral 805 denotes a print button. When the user presses the print button 805, an instruction to print selected document data is transmitted to the main controller unit 201.

A process executed by the image forming apparatus according to the embodiment will be explained.

A process in the image forming apparatus 102 upon reception of a print instruction from the operation unit 202 (when the image forming apparatus 102 holds document data to be processed) will be described.

More specifically, a process until the image forming apparatus 102 prints document data on a print medium (paper) on the basis of an instruction to print the print data when the document management area 1006 of the image forming apparatus 102 stores document data to be processed will be explained with reference to FIG. 9.

Figure 9:
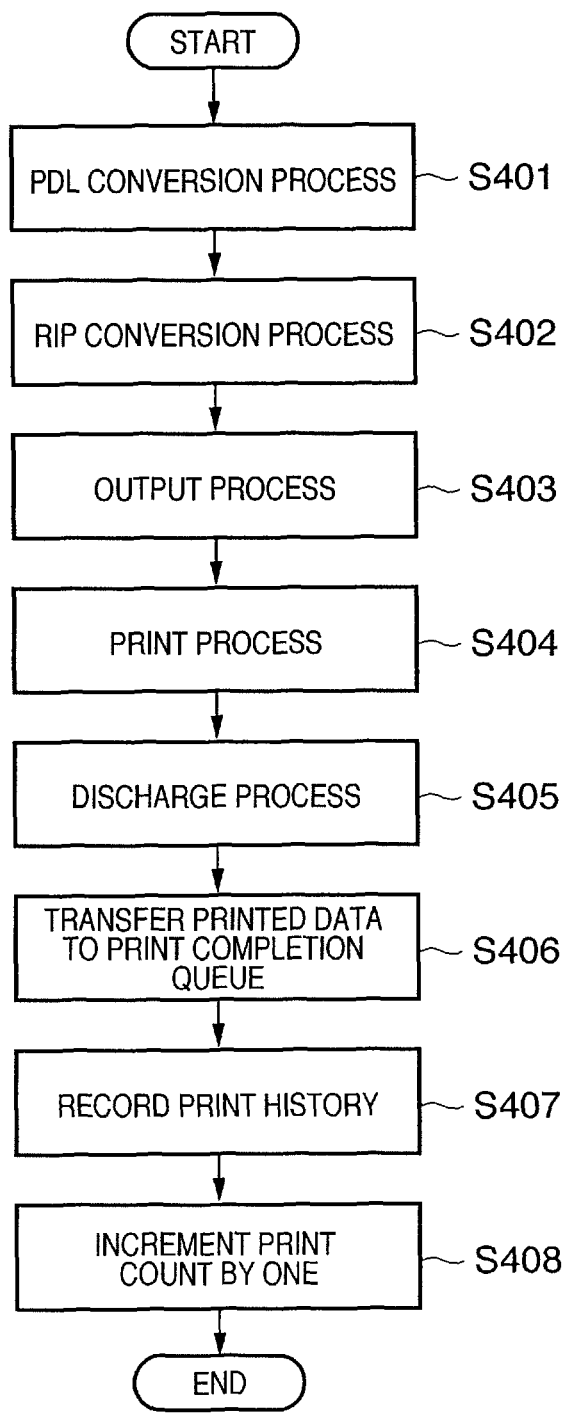
FIG. 9 is a flowchart showing an example of data processing procedures in the image forming apparatus according to the embodiment of the present invention.

FIG. 9 is a flowchart showing an example of data processing procedures in the image forming apparatus according to the embodiment of the present invention.

This flowchart corresponds to, for example, procedures until the main controller unit 201 of the image forming apparatus 102 receives from the operation unit 202 an instruction to print a target print job, and prints corresponding document data on paper on the basis of the print job.

In step S401, the main controller unit 201 looks up the document management table 900, performs a data conversion process to convert document data in the document management area 1006 into a page description language called PDL, and stores the PDL data in the cache area 1003. The PDL stands for Page Description Language.

In step S402, the main controller unit 201 executes a RIP (Raster Image Processing) process for the PDL data spooled in the cache area 1003 to convert the PDL data into raster image data.

The obtained raster image data is expanded into the image memory 208. In step S403, the output processing unit 213 of the print unit 210 executes an output process to correct the image data into data suited to print on paper. The output process includes, e.g., gamma conversion, edge emphasis, and smoothing. The PWM unit 212 converts the image data converted into data suited to print, into a laser driving signal, which is sent to the printer unit 211.

In step S404, the printer unit 211 executes a print process to print an image on paper on the basis of the laser driving signal. After the end of the image data print process, the discharge unit 217 receives and discharges the printed paper in step S405.

The controller unit 222 which controls the discharge unit 217 communicates with the main controller unit 201 via the I/O unit 223, and the discharge unit 217 controls various discharge processes. The controller unit 222 executes control to deliver paper by the paper feed motor driving unit 219, control the paper flow by the paper path control unit 221, monitor the paper flow by the paper sensor unit 218, and control the tray motor driving unit 220 to discharge paper onto an arbitrary tray.

After the end of printing an image by the above process, the main controller unit 201 transfers the printed data from the spooler (print queue area 1004) of the data storage unit 207 to the print completion queue (printed-data save area 1005) in step S406. The print completion queue (printed-data save area 1005) obviates the need to convert data again in external communication, a RIP process, or the like when printing again printed data.

This arrangement allows an operator to print image data saved in the print completion queue again on paper at high speed in accordance with a remote print instruction from the printing client 101 or a print instruction from the operation unit 202 of the image forming apparatus 102.

In step S407, the main controller unit 201 records the print history in the print history file for saving print history information, and ends the process.

The print history is a file created in the print history data save area 1007 of the data storage unit 207. The print history file (FIG. 4) saves, as history information, information related to printing such as a print user name, print data name, print start time, print end time, print data capacity, print count, print paper size, and comments on print data.

In step S408, the main controller unit 201 increments the print count 905 of the document management table 900 by one.

An arrangement when a plurality of image forming apparatuses cooperate with each other will be explained.

Figure 10:
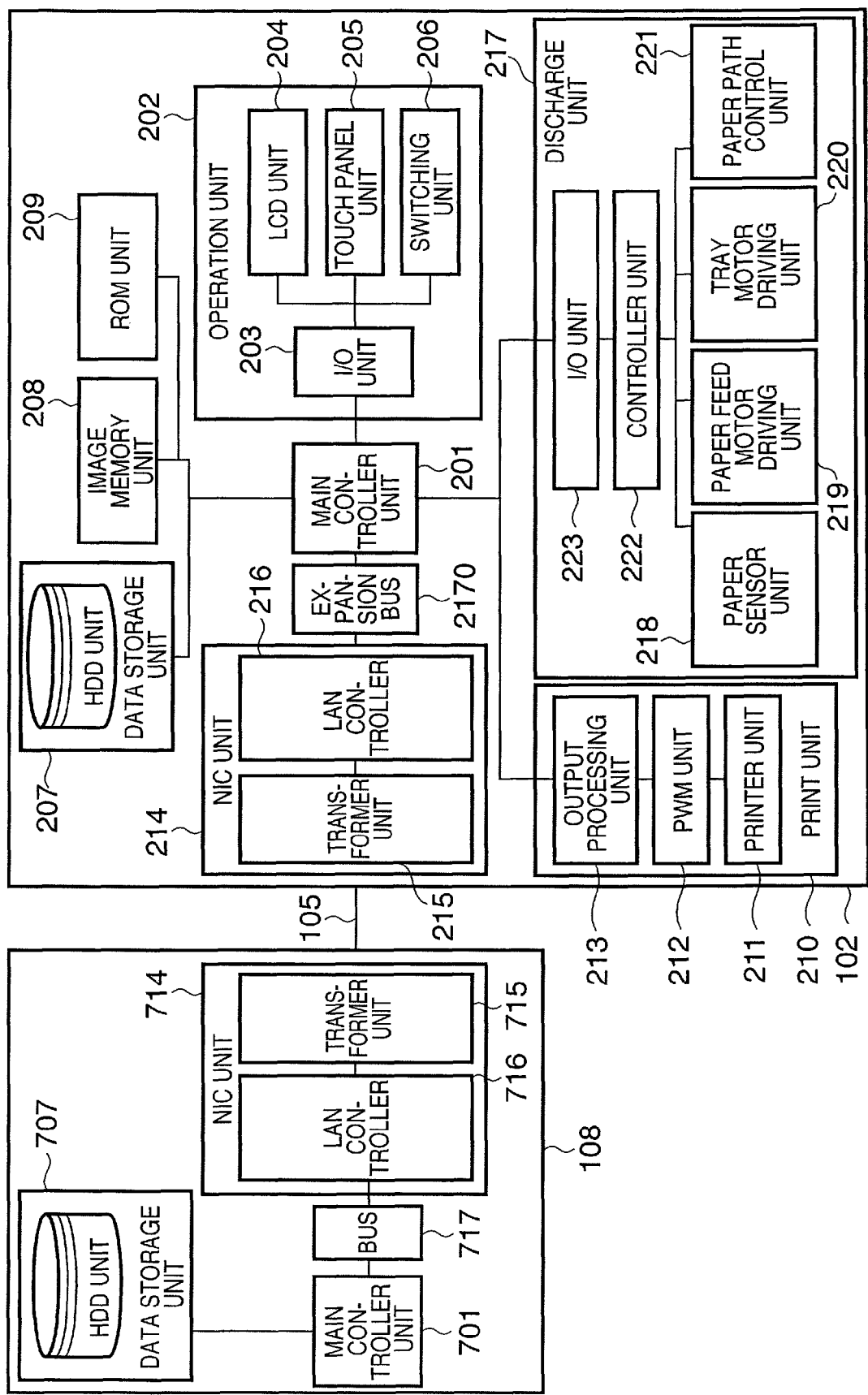
FIG. 10 is a block diagram for explaining a case where a plurality of image forming apparatuses communicate with each other according to the embodiment of the present invention.

FIG. 10 is a block diagram for explaining a case where a plurality of image forming apparatuses communicate with each other according to the embodiment of the present invention.

In FIG. 10, reference numerals 701 to 717 denote some of modules in the image forming apparatus 108 that have the same functions as those of the image forming apparatus 102.

In particular, the arrangement in FIG. 10 can store document data to be printed in the data storage unit of one of image forming apparatuses. In actually performing a process, document data to be processed is acquired from an image forming apparatus which is to perform the process, or an external image forming apparatus, and the image forming apparatus can print the document data.

In the arrangement of FIG. 10, the data storage unit in an image forming apparatus which is to perform a process does not always store document data to be printed. Especially when the data storage unit in an external image forming apparatus other than the image forming apparatus which is to perform a process stores document data to be processed, the image forming apparatus which is to perform a process acquires the document data from the external image forming apparatus.

A process in the image forming apparatus upon reception of a print instruction from the operation unit 202 (when an external image forming apparatus stores document data to be processed) will be described.

More specifically, a process until the image forming apparatus 102 prints document data on a print medium (paper) when the external image forming apparatus 108 stores the document data will be explained with reference to FIGS. 11A and 11B.

Figure 11A:
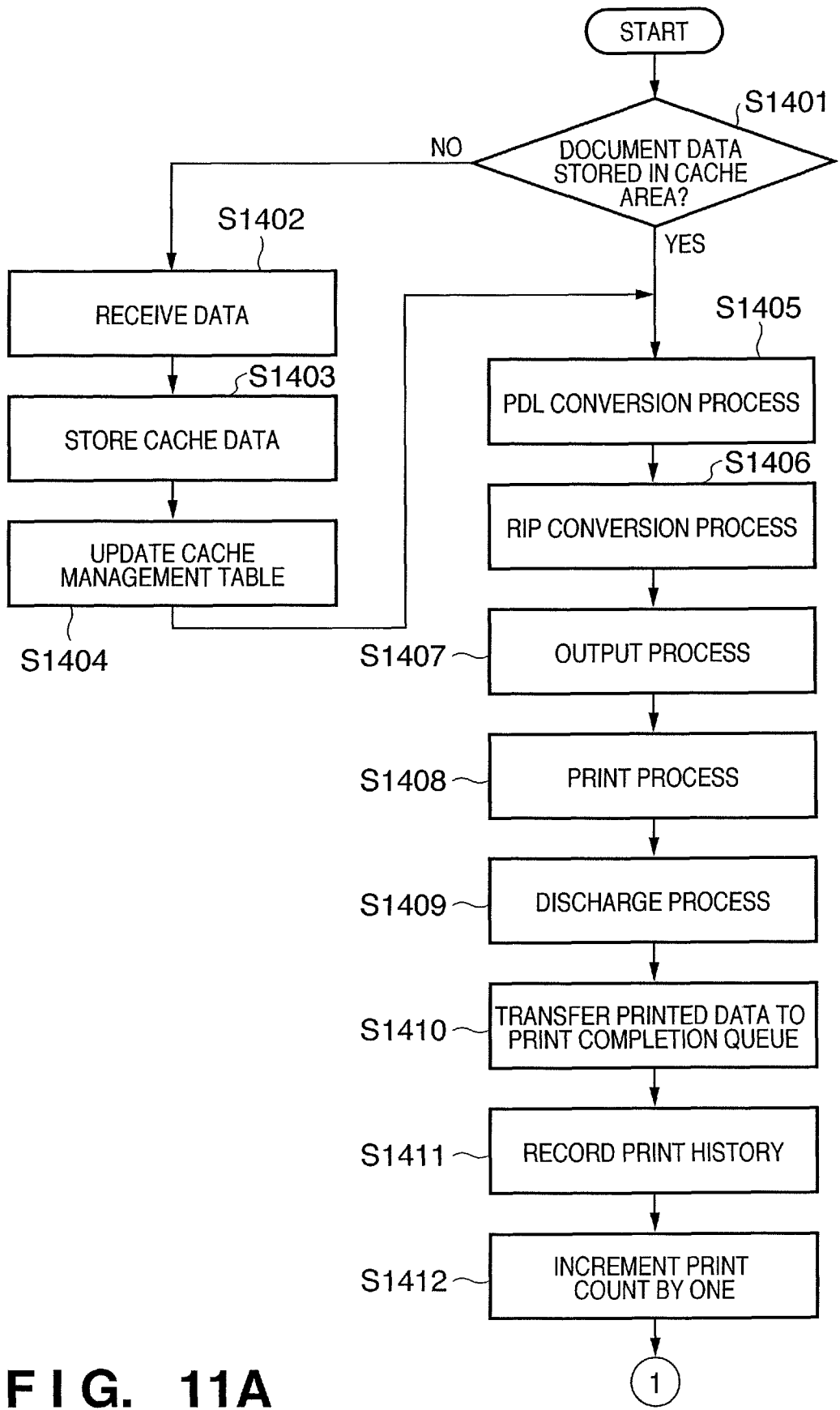
FIGS. 11A and 11B are flowcharts showing an example of data processing procedures in the image forming apparatus according to the embodiment of the present invention.
Figure 11B:
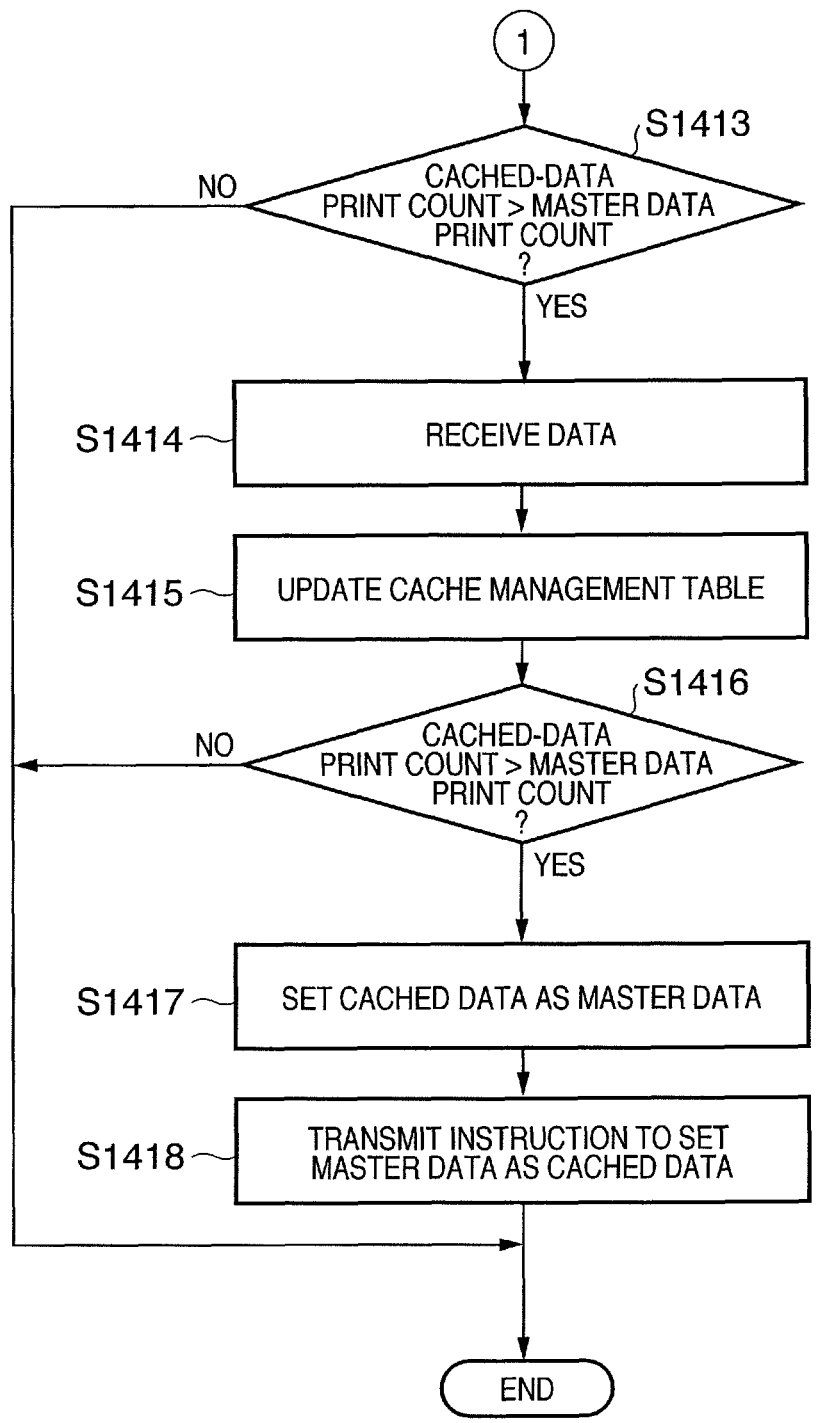

FIGS. 11A and 11B are flowcharts showing an example of data processing procedures in the image forming apparatus according to the embodiment of the present invention.

In step S1401, the image forming apparatus 102 determines, from its cache area management table 600, whether the cache area 1003 stores document data to be processed. If the cache area 1003 stores the document data (YES in step S1401), the process advances to step S1405. If the cache area 1003 does not store the document data to be processed (NO in step S1401), the process advances to step S1402.

In step S1402, the image forming apparatus 102 receives the document data (master data) to be processed. The image forming apparatus 102 can determine the storage position of the document data to be received by referring to the master data storage position 604 of the cache area management table.

For example, when the image forming apparatus 102 does not have the document data to be processed and the image forming apparatus 108 manages it, the image forming apparatus 102 communicates with the image forming apparatus 108 via the LAN 104 in order to receive the document data.

This communication uses, e.g., the TCP/IP protocol as a communication protocol. In communication using the TCP/IP protocol, two hosts must establish a connection before the start of data communication. For this purpose, the image forming apparatus 102 transmits a connection request (TCP segment with an "ON" SYN bit) to the image forming apparatus 108. The image forming apparatus 108 receives the connection request from the NIC unit 214 via the LAN 104, Internet 105, and LAN 106.

In the NIC unit 714 of the image forming apparatus 108, the transformer unit 715 transforms the voltage of the received data, and sends the resultant data to the LAN controller 716. The LAN controller 716 monitors the connection request, and if detecting the connection request, establishes a connection in accordance with normal procedures defined by the TCP/IP protocol. After the image forming apparatuses 102 and 108 establish a connection, the image forming apparatus 102 receives document data stored in the document management area 1006 of the data storage unit 707 in the image forming apparatus 108 and the print count in the document management table.

In step S1403, the image forming apparatus 102 stores the document data received from the image forming apparatus 108 in the cache area 1003 of the data storage unit 207. In step S1404, the image forming apparatus 102 writes information on the stored document data in the cache area management table 600. More specifically, the image forming apparatus 102 writes the received print count corresponding to the received document data as the master data print count 605.

Procedures in steps S1405 to S1411 correspond to those in steps S401 to S407, and a detailed description thereof will be omitted.

In step S1412, the image forming apparatus 102 increments by one the cached-data print count 606 corresponding to the processed document data in the cache area management table 600. In step S1413, the image forming apparatus 102 compares the cached-data print count 606 with the master data print count 605 in the cache area management table 600.

If the cached-data print count 606 is larger than the master data print count 605 as a result of comparison (YES in step S1413), the process advances to step S1414. If the cached-data print count 606 is equal to or smaller than the master data print count 605 (NO in step S1413), the process ends.

In step S1414, the image forming apparatus 102 acquires the print count of the image forming apparatus 108 which manages the master data. In step S1415, the image forming apparatus 102 updates the master data print count 605 of the cache area management table 600. In step S1416, the image forming apparatus 102 compares the cached-data print count 606 with the master data print count 605 again. If the cached-data print count 606 is larger than the master data print count 605 as a result of comparison (YES in step S1416), the process advances to step S1417. If the cached-data print count 606 is equal to or smaller than the master data print count 605 (NO in step S1416), the process ends.

In step S1417, the image forming apparatus 102 sets the cached data as master data. That is, the image forming apparatus 102 moves the document data stored in the cache area 1003 to the document management area 1006, and moves the information on the document data from the cache area management table 600 to the document management table 900. At this time, the image forming apparatus 102 sets the cached-data print count 606 as the print count.

In step S1418, the image forming apparatus 102 transmits, to the image forming apparatus 108, an instruction to set, as cached data, the document data which has been managed as master data in the image forming apparatus 108.

More specifically, the image forming apparatus 102 transmits, to the image forming apparatus 108, an instruction to change the master data in the image forming apparatus 108 into cached data because the cached data in the image forming apparatus 102 is managed as master data. Upon reception of this instruction, the image forming apparatus 108 moves the document data managed as master data in the document management area 1006 to the cache area of the image forming apparatus 108, deletes a corresponding management record from the document management table, and moves the management record to the cache area management table.

In FIGS. 11A and 11B, the cached-data print count 606 and master data print count 605 are compared with each other twice in steps S1413 and S1416. This is because, even if the cached-data print count 606 exceeds the master data print count 605 in the first comparison, the cached-data print count 606 may become smaller than the master data print count 605 at the timing of the second comparison.

A case is also assumable where printing is executed to make the master data print count 605 much larger than the cached-data print count 606 till the timing of the second comparison depending on the process situation of another image forming apparatus. Thus, even when the cached-data print count 606 exceeds the master data print count 605 in the first comparison, the cached-data print count 606 is likely to become smaller than the master data print count 605 in the second comparison.

If management of master data shifts to the image forming apparatus from an external image forming apparatus immediately after the first comparison, management of the master data may return to the external image forming apparatus again when the situation is reversed in the second comparison. If the situation is repetitively reversed within a short time, the master data management destination often switches between the image forming apparatus and the external image forming apparatus. This is disadvantageous in terms of the data transfer efficiency of the network and the process load of each apparatus.

The embodiment assumes this situation. When the cached-data print count 606 exceeds the master data print count 605, they are compared with each other again in order to determine whether they maintain this relationship. Only after the cached-data print count 606 and master data print count 605 maintain the relationship as a result of the second comparison, the image forming apparatus manages the master data from the external image forming apparatus. This can prevent a frequent change of the master data management destination between the image forming apparatus and the external image forming apparatus even in a situation in which the relationship between the cached-data print count 606 and the master data print count 605 is alternately reversed within a relatively short period.

The cached-data print count 606 and master data print count 605 are compared twice in the embodiment, but may be compared only once or three or more times. The cached-data print count 606 and master data print count 605 may be compared the second and subsequent times the lapse of a predetermined time after the first comparison.

As described above, according to the embodiment, storage devices in a plurality of image forming apparatuses on a network manage their document data as master data. If a storage device in an external image forming apparatus manages document data to be processed as master data, an image forming apparatus acquires the document data, stores and manages it as temporarily cached data, and prints the document data.

If the user designates output of the same document data again and the image forming apparatus holds corresponding cached data, the image forming apparatus prints the cached data and manages the print count of the cached data (cached-data print count). If the image forming apparatus does not hold corresponding cached data, it acquires master data again from the external image forming apparatus, prints the master data, and manages the print count of the master data (master data print count).

How to manage the cached data and master data in the image forming apparatus is reversed in accordance with the relationship between the cached-data print count and the master data print count. Especially when the cached-data print count exceeds the master data print count, the cached data is set as master data, and the master data is managed in the image forming apparatus which printed the cached data. As a result, the master data storage position is changed.

That is, according to the embodiment, when the print count of cached data in the image forming apparatus is larger than that of master data in the external image forming apparatus, the image forming apparatus manages, as master data, document data which has been managed as master data in the external image forming apparatus.

An image forming apparatus which uses master data more often manages the master data. The embodiment can simplify a process to acquire master data from an external image forming apparatus via a network and output the master data by an image forming apparatus. Consequently, the embodiment can reduce the master data transfer frequency between image forming apparatuses.

In this manner, the embodiment adaptively changes the storage position of document data in accordance with the print count of the document data by each image forming apparatus in an image forming system capable of mutually acquiring document data in the storage devices of image forming apparatuses via a network and printing. The embodiment can avoid unnecessary document data transfer between image forming apparatuses.

As for common data, only one of apparatuses on the network suffices to hold the master data. This leads to saving of the capacity of the storage device of each image forming apparatus which constitutes the system.

As described above, an apparatus which holds master data is determined by comparing print counts in image forming apparatuses. Alternatively, a predetermined threshold may be determined in advance, and when it is determined that the print count in a given image forming apparatus has reached the threshold, the image forming apparatus may manage master data.

In this case, the image forming apparatus notifies other image forming apparatuses that it becomes a master data management apparatus, similar to the above-described case. Note that a plurality of thresholds are set, and when the print count has reached a threshold in a given apparatus, other apparatuses notified of this invalidate a threshold of the first stage, and set a threshold of the next stage as a threshold for setting cached data as master data. This process can reduce the print count comparison burden.

The above example has described processes based on the print execution count. However, these processes may be based on not the print count but the count at which data is displayed and browsed on the display device, or the count at which downloading of master data is designated. It is also possible not to increment the count only upon browsing or downloading, but to increment it only when, for example, the operator designates "interested".

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-311805, filed on Oct. 26, 2005, which is hereby incorporated by reference herein in its entirety.

What is claimed is:

1. An image forming apparatus capable of transmitting/receiving data to/from another image forming apparatus on a network, comprising:
    a holding unit adapted to hold storage position information of document data stored in the other image forming apparatus;
    an acquisition unit adapted to acquire the document data to be printed from the other image forming apparatus by referring to the storage position information;
    a print unit adapted to print the document data acquired by said acquisition unit;
    a determination unit adapted to determine whether or not a print count of the document data having already been printed by said print unit exceeds a predetermined count, and
    a storage unit adapted to store the document data acquired by said acquisition unit as master data when said determination unit determines that the print count exceeds the predetermined count,
    wherein, when the document data is not stored in said storage unit as master data, said acquisition unit is adapted to re-acquire the document data from the other image forming apparatus for printing a next time by said print unit, and
    wherein, when the document data is stored in said storage unit as master data, said print unit is adapted to print the document data stored in said storage unit without re-acquiring the document data from the other image forming apparatus when the document data is printed the next time.

2. The apparatus according to claim 1, wherein said determination unit is adapted to perform its determination every time said print unit completes printing.

3. The apparatus according to claim 1, further comprising a display unit adapted to display the master data stored in said storage unit of the image forming apparatus and master data stored in a storage unit of the other image forming apparatus, and display an operation window for designating arbitrary master data from the displayed master data and designating printing.

4. The apparatus according to claim 1, wherein said acquisition unit is adapted to acquire the document data to be printed via the network from the other image forming apparatus which stores the document data to be printed as the master data.

5. The apparatus according to claim 4, wherein said predetermined count is a print count of the document data printed by the other image forming apparatus which stores the document data as the master data.

6. The apparatus according to claim 4, further comprising an instruction unit adapted to instruct the other image forming apparatus, which stores the document data as the mater data, not to store the document data as a master data, when said determination unit determines that the print count exceeds the predetermined count.

7. The apparatus according to claim 1, wherein the master data is original document data which is originally stored in said storage unit of the image forming apparatus.

8. The apparatus according to claim 1,
wherein said acquisition unit is adapted to acquire the document data to be printed via the network from the other image forming apparatus which stores the document data to be printed as the master data,
wherein said predetermined count is a print count of the document data printed by the other image forming apparatus which stores the document data as the master data, and
wherein the apparatus further comprises an instruction unit adapted to instruct the other image forming apparatus, which stores the document data as the mater data, not to store the document data as a master data, when said determination unit determines that the print count exceeds the predetermined count.

9. An image forming system capable of mutually transmitting/receiving data between a plurality of image forming apparatuses via a network, each of the plurality of image forming apparatuses comprising:
a holding unit adapted to hold storage position information of document data stored in another image forming apparatus;
an acquisition unit adapted to acquire the document data to be printed from the other image forming apparatus by referring to the storage position information;
a print unit adapted to print the document data acquired by said acquisition unit;
a determination unit adapted to determine whether or not a print count of the document data having already been printed by said print unit exceeds a predetermined count, and
a storage unit adapted to store the document data acquired by said acquisition unit as master data when said determination unit determines that the print count exceeds the predetermined count,
wherein, when the document data is not stored in said storage unit as master data, said acquisition unit is adapted to re-acquire the document data from the other image forming apparatus for printing a next time by said print unit, and
wherein, when the document data is stored in said storage unit as master data, said print unit is adapted to print the document data stored in said storage unit without re-acquiring the document data from the other image forming apparatus when the document data is printed the next time.

10. The image forming system according to claim 9,
wherein said acquisition unit is adapted to acquire the document data to be printed via the network from the other image forming apparatus which stores the document data to be printed as the master data,
wherein said predetermined count is a print count of the document data printed by the other image forming apparatus which stores the document data as the master data, and
wherein each of the plurality of image forming apparatuses further comprises an instruction unit adapted to instruct the other image forming apparatus, which stores the document data as the mater data, not to store the document data as a master data, when said determination unit determines that the print count exceeds the predetermined count.

11. A method of controlling an image forming apparatus capable of transmitting/receiving data to/from another image forming apparatus on a network, comprising:
an acquisition step of acquiring document data to be printed from the other image forming apparatus by referring to storage position information of the document data stored in the other image forming apparatus;
a print step of printing, with a print unit of the image forming apparatus, the document data acquired in the acquisition step;
a determination step of determining whether or not a print count of the document data having already been printed by said print unit exceeds a predetermined count, and
a storage step of storing the document data acquired in said acquisition step as master data when it is determined in said determination step that the print count exceeds the predetermined count,
wherein, when the document data is not stored in said storage step as master data, said acquisition step re-acquires the document data from the other image forming apparatus for printing a next time by said print unit, and
wherein, when the document data is stored in said storage step as master data, said print step includes printing the document data stored in said storage unit without re-acquiring the document data from the other image forming apparatus when the document data is printed the next time.

12. The method according to claim 11,
wherein said acquisition step includes acquiring the document data to be printed via the network from the other image forming apparatus which stores the document data to be printed as the master data,
wherein said predetermined count is a print count of the document data printed by the other image forming apparatus which stores the document data as the master data, and
wherein the method further comprises an instruction step of instructing the other image forming apparatus, which stores the document data as the mater data, not to store the document data as a master data, when it is determined in said determination step that the print count exceeds the predetermined count.

13. A non-transitory computer-readable storage medium storing a program, which, when executed by a computer, causes the computer to perform a control method of controlling an image forming apparatus capable of transmitting/ receiving data to/from another image forming apparatus on a network, the method comprising:
- an acquisition step of acquiring document data to be printed from the other image forming apparatus by referring to storage position information of the document data stored in the other image forming apparatus;
- a print step of printing, with a print unit of the image forming apparatus, the document data acquired in the acquisition step;
- a determination step of determining whether or not a print count of the document data having already been printed by said print unit exceeds a predetermined count, and
- a storage step of storing the document data acquired in said acquisition step as master data when it is determined in said determination step that the print count exceeds the predetermined count,
- wherein, when the document data is not stored in said storage step as master data, said acquisition step re-acquires the document data from the other image forming apparatus for printing a next time by said print unit, and
- wherein, when the document data is stored in said storage step as master data, said print step includes printing the document data stored in said storage unit without re-acquiring the document data from the other image forming apparatus when the document data is printed the next time.

14. The non-transitory computer-readable storage medium according to claim 13,
- wherein said acquisition step includes acquiring the document data to be printed via the network from the other image forming apparatus which stores the document data to be printed as the master data,
- wherein said predetermined count is a print count of the document data printed by the other image forming apparatus which stores the document data as the master data, and
- wherein the method further comprises an instruction step of instructing the other image forming apparatus, which stores the document data as the mater data, not to store the document data as a master data, when it is determined in said determination step that the print count exceeds the predetermined count.

* * * * *